(12) United States Patent
Wu

(10) Patent No.: US 12,552,304 B2
(45) Date of Patent: Feb. 17, 2026

(54) COMPOSITE MATERIAL SEAT

(71) Applicant: TAIWAN RACING PRODUCTS CO., LTD., Changhua County (TW)

(72) Inventor: Wen-Yuan Wu, Changhua County (TW)

(73) Assignee: TAIWAN RACING PRODUCTS CO., LTD., Changhua County Dacun Township (TW)

( * ) Notice: Subject to any disclaimer, the term of this patent is extended or adjusted under 35 U.S.C. 154(b) by 160 days.

(21) Appl. No.: 18/505,321

(22) Filed: Nov. 9, 2023

(65) Prior Publication Data

US 2025/0153621 A1    May 15, 2025

(51) Int. Cl.
  *B60N 2/68*  (2006.01)
  *B60N 2/66*  (2006.01)
(52) U.S. Cl.
  CPC ............... *B60N 2/68* (2013.01); *B60N 2/66* (2013.01)

(58) Field of Classification Search
  CPC ..................... B60N 2/68; B60N 2/66
  See application file for complete search history.

(56) References Cited

U.S. PATENT DOCUMENTS

2008/0038569 A1*  2/2008  Evans ................ 428/474.9

FOREIGN PATENT DOCUMENTS

| CN | 104816660 A | * | 8/2015 |
| KR | 20160029878 A | * | 3/2016 |

* cited by examiner

*Primary Examiner* — Anthony D Barfield
(74) *Attorney, Agent, or Firm* — MUNCY, GEISSLER, OLDS & LOWE, P.C.

(57) ABSTRACT

A composite material seat is provided, including: a main body, including a back support portion and a seat portion which are integrally formed from composite material, the back support portion extending longitudinally, the back support portion having at least two first reinforcement ribs transversely extending to each other; thus, it provides high structural strength and high support.

10 Claims, 6 Drawing Sheets

COMPOSITE MATERIAL SEAT

BACKGROUND OF THE INVENTION

Field of the Invention

The present invention relates to a composite material seat.

Description of the Prior Art

When it comes to racing seats, support and safety are of paramount importance. The important consideration is that the racing seats must be designed to protect the drivers in the event of a vehicle collision or rollover. With the advancement of technology, more and more vehicle manufacturers begin to pay attention to lightweight racing seats, and they usually choose specific materials to manufacture thin and lightweight racing seats.

However, even though the conventional racing seats are made of the specific materials (such as carbon fibers) which possess high structural strength to provide support. The racing seats will be deformed and broken due to insufficient support when the racing seats experience a hard impact, such as a severe collision or crash. Therefore, the safety of the conventional racing seats is insufficient.

The present invention is, therefore, arisen to obviate or at least mitigate the above-mentioned disadvantages.

SUMMARY OF THE INVENTION

The main object of the present invention is to provide a composite material seat, which has strong structural strength and high support.

To achieve the above and other objects, the composite materials is provided, including a main body, including a back support portion and a seat portion which are integrally formed from a composite material, the back support portion extending longitudinally, the back support portion having at least two first reinforcement ribs extending laterally and at least one second reinforcement rib extending longitudinally, and each of the at least one second reinforcement rib transversely connected with the at least two first reinforcement ribs.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
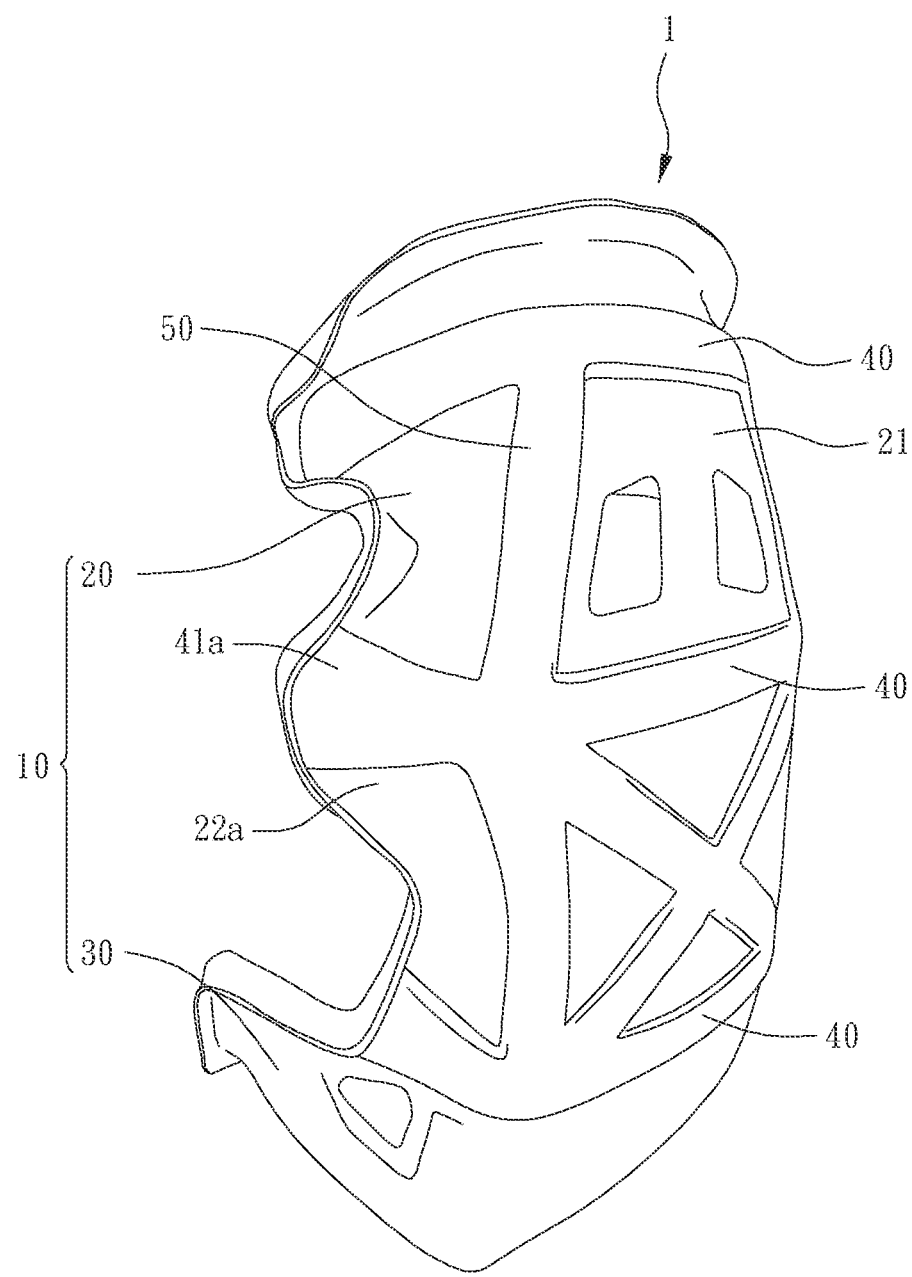
FIG. 1 is a stereogram of a preferable embodiment of the present invention.
Figure 2:
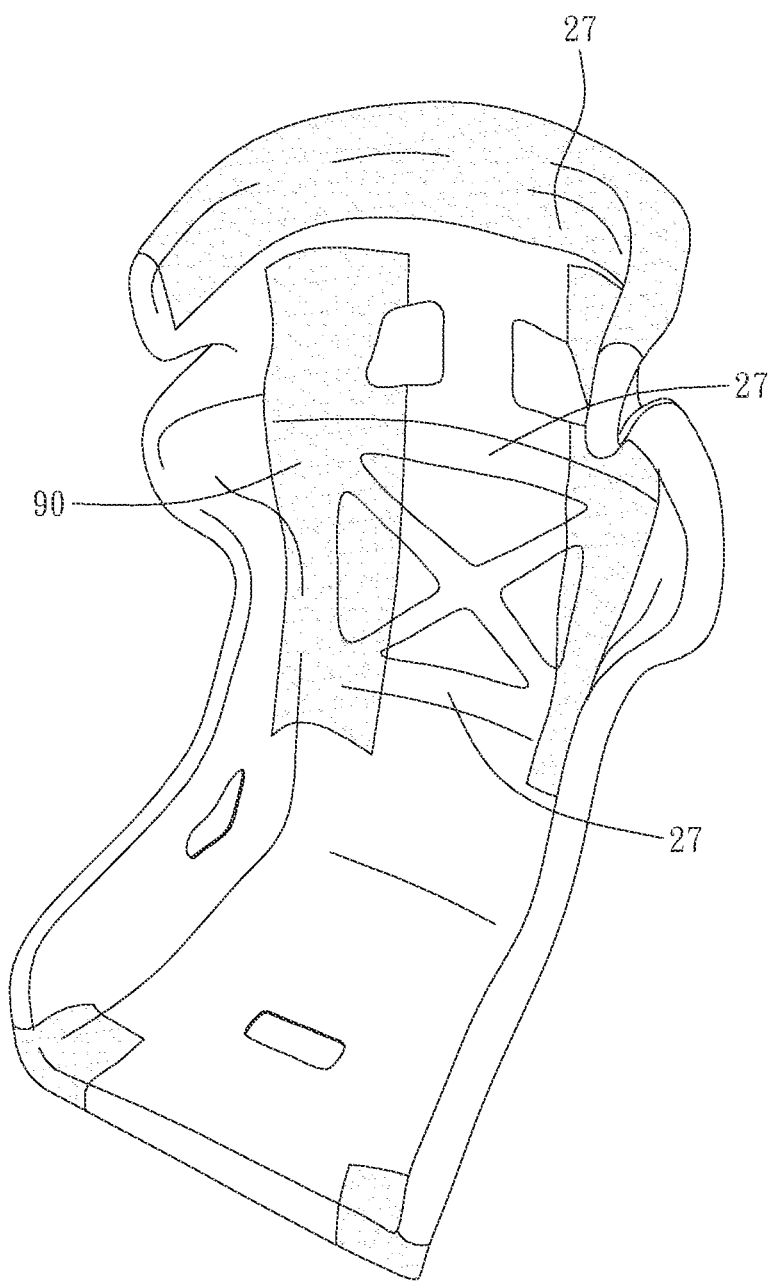
FIG. 2 is another stereogram of a preferable embodiment of the present invention.
Figure 3:
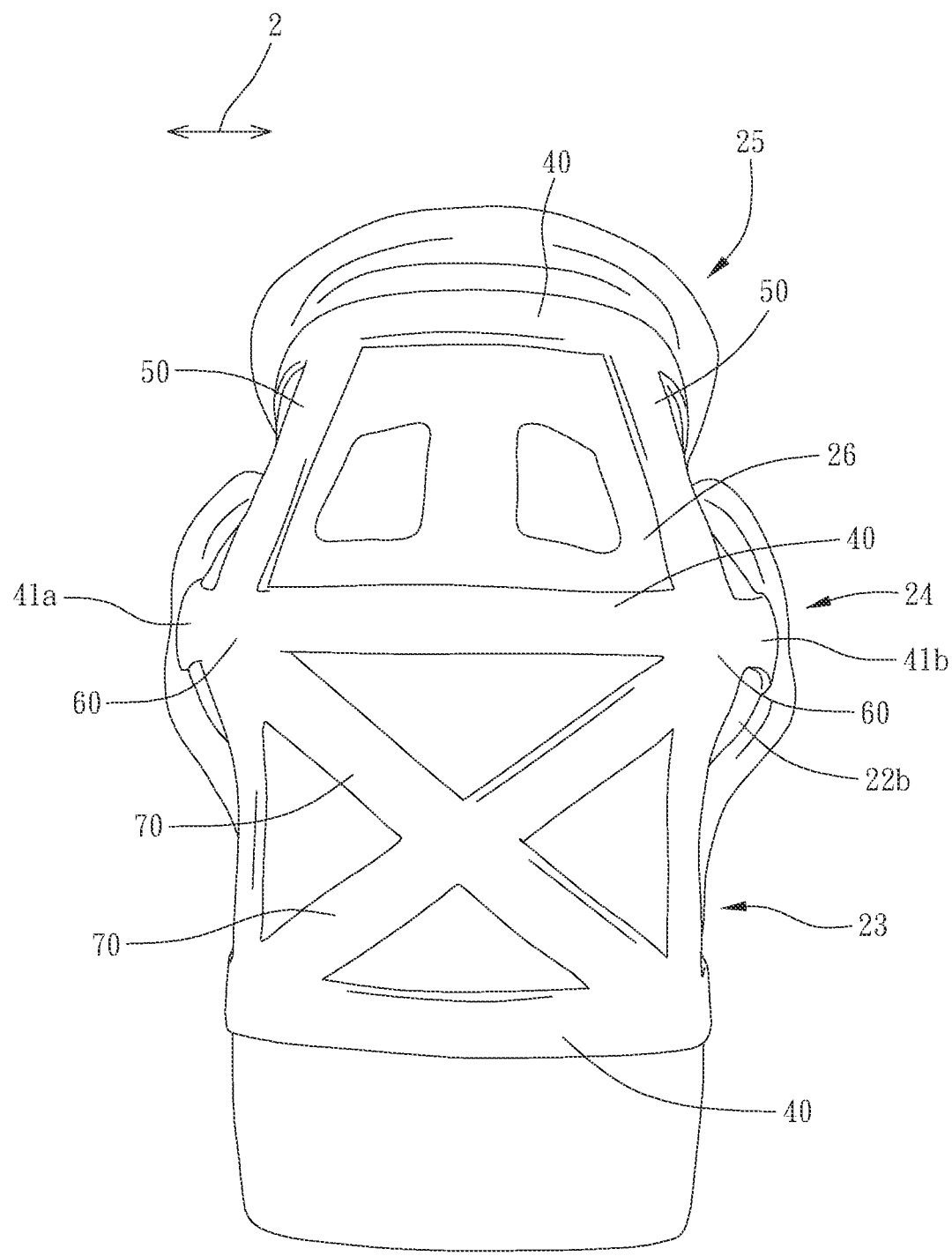
FIG. 3 is a rear view of a preferable embodiment of the present invention.

Please refer to FIGS. 1 to 6 for a preferable embodiment of the present invention. A composite material seat 1 of the present invention includes a main body 10.

The main body 10 includes a back support portion 20 and a seat portion 30 which are integrally formed from a composite material 80. The back support portion 20 extends longitudinally.

The back support portion 20 has at least two first reinforcement ribs 40 extending laterally and at least one second reinforcement rib 50 extending longitudinally. The back support portion 20 is integrally deformed to protrude rearwardly to form the at least two first reinforcement ribs 40. A thickness dimension T2 of each of the at least two first reinforcement ribs 40 is greater than a thickness dimension T1 of the back support portion 20. Each of the at least one second reinforcement rib 50 is transversely connected with the at least two first reinforcement ribs 40. Specifically, each of the at least two first reinforcement ribs 40 is integrally disposed on the back support portion 20. The back support portion 20 includes a lower back portion 23, a shoulder support portion 24 and a head support portion 25 which are disposed sequentially away from the seat portion 30. The back support portion 20 includes at least three said first reinforcement ribs 40 which are respectively disposed on the lower back portion 23, the shoulder support portion 24 and the head support portion 25. The lower back portion 23 corresponds to a driver's waist and back; the shoulder support portion 24 corresponds to the driver's shoulders; the head support portion 25 corresponds to the driver's head.

The structural strength of multiple portions of the composite material seat 1 is enhanced through the at least three first reinforcement ribs 40, which correspond, for example, to the driver's head, lower back, and shoulders. Furthermore, the lateral support of the composite material seat 1 is enhanced by each of the at least three first reinforcement ribs 40 extending toward the left side and the right side of the composite material seat 1, so as to effectively disperse impact and forces on the left and right sides of the composite material seat 1. Therefore, the back support portion 20 can stably protect the driver and resist deformation or fracture caused by the impact force.

In this embodiment, the composite material seat 1 is particularly designed for use in a bucket-style seat, especially for racing purposes.

The at least one second reinforcement rib 50 is transversely connected with the at least three first reinforcement ribs 40. In this embodiment, the back support portion 20 has a plurality of said second reinforcement ribs 50, and the plurality of second reinforcement ribs 50 are disposed separately in a lateral direction 2. Furthermore, each of the plurality of second reinforcement ribs 50 extends along the lower back portion 23, the shoulder support portion 24, and the head support portion 25.

Specifically, the back support portion 20 includes a backrest portion 21 and two side portions 22a, 22b. The two side portions 22a, 22b integrally extend from opposite two sides of the backrest portion 21 and toward a front side of the back support portion 20. Each of the at least two (three) first reinforcement ribs 40 extends along the backrest portion 21 and the two side portions 22a, 22b. At least one connection portion 60 is formed where at least one of the at least two (three) first reinforcement ribs 40 intersects with the at least one second reinforcement rib 50. In this embodiment, a plurality of said connection portions 60 are formed where the at least three first reinforcement ribs 40 intersect with the plurality of second reinforcement ribs 50. And the at least one second reinforcement rib 50 (the plurality of second reinforcement ribs 50) and the at least of connection portion 60 (the plurality of connection portions 60) are respectively located at an intersection portion where the backrest portion 21 and (one of) the two side portions 22a, 22b intersect with each other.

In this embodiment, the two second reinforcement ribs 50 are located at two said intersection portions where the backrest portion 21 and the two side portions 22a, 22b intersect with each other.

Preferably, at least one end portion 41a, 41b of each of the at least two first reinforcement ribs 40 gradually widens from the backrest portion 21 toward at least one of the two side portions 22a, 22b. In this embodiment, two end portions 22a, 22b of each of the at least two first reinforcement ribs 40 gradually widens from the backrest portion 21 toward the two side portions 22a, 22b. Specifically, the end portion 41a gradually widens towards the side portion 22a. The end portion 41b gradually widens towards the side portion 22b. Therefore, the end portions 41a, 41b provide a wide range of structural reinforcement and high support strength, thereby improving the structural strength of a curved structure of each of the two side portions 22a, 22b.

As a result, the composite material seat 1 can evenly distribute impact and compressive forces in multiple directions, including frontal impact forces (such as those caused by the driver leans back or other external impacts) and lateral impact forces (such as lateral compressive force caused by the driver or other external impacts).

Therefore, the composite material seat 1 can withstand greater impact and provide high support and safety. Specifically, the forces acting on each of the plurality of second reinforcement ribs 50 and each of the at least three first reinforcement ribs 40 can be directed to the connection portion 60, so as to improve the structure strength between the backrest portion 21 and the two side portions 22a, 22b.

The back support portion 20 has at least one oblique reinforcement rib 70 extending obliquely, and the at least one oblique reinforcement rib 70 is connected between the at least two (three) first reinforcement ribs 40. In this embodiment, the back support portion 20 has two said oblique reinforcement ribs 70, and the two oblique reinforcement ribs 70 are connected and crossed to each other. In this embodiment, the two oblique reinforcement ribs 70 form an X-shaped structure. Each of the two oblique reinforcement ribs 70 is connected between the at least three of first reinforcement ribs 40. Each of the two oblique reinforcement ribs 70 is disposed on the lower back portion 23 which corresponds to the driver's waist. Accordingly, the composite material seat 1 can withstand and distribute impact and compressive forces in multiple directions (frontal and lateral), and improve structural strength, particularly for the driver's waist and back.

The composite material 80 includes a plurality of first composite material layers 81 stacked on one another and a plurality of second composite material layers 82 stacked on one another. The back support portion 20 includes a base portion 26. Each of the at least two (three) first reinforcement ribs 40 is protruded from the base portion 26. The plurality of first composite material layers 81 are formed the base portion 26. The plurality of second composite material layers 82 are disposed on at least one of the plurality of first composite material layers 81. The plurality of second composite material layers 82 and the plurality of first composite material layers 81 are formed each of the at least two (three) first reinforcement ribs 40. Each of the plurality of first composite material layers 81 and each of the plurality of second composite material layer 82 can be made from the same or different materials.

In this embodiment, each of the plurality of second reinforcement ribs 50 and each of two said oblique reinforcement ribs 70 are respectively protruded from the base portion 26. The plurality of second composite material layers 82 are disposed on at least one said first composite material layer 81 and correspond to each of the plurality of second reinforcement ribs 50 and each of two said oblique reinforcement ribs 70. The plurality of second composite material layers 82 and the plurality of first composite material layers 81 are formed each of the plurality of second reinforcement ribs 50 and each of two said oblique reinforcement ribs 70. A longitudinal extension dimension of each of the plurality of second composite material layers 82 is less than a longitudinal extension dimension of each of the plurality of first composite material layers 81.

Specifically, a layer number of of the composite material 80 of each of the at least two first reinforcement ribs 40, a layer number of of the composite material 80 of each of the two second reinforcement ribs 50 and a layer number of of the composite material 80 of each of the two oblique reinforcement ribs 70 are greater than a layer number of the composite material 80 of the base portion 26, so as to increase the structural strength of each of the plurality of first reinforcement ribs 40, each of the second reinforcement ribs 50 and each of two said oblique reinforcement ribs 70 and achieve lightweight.

The plurality of first composite material layers 81 and the plurality of second composite material layers 82 each includes at least one of carbon fibers and glass fibers.

Figure 5:
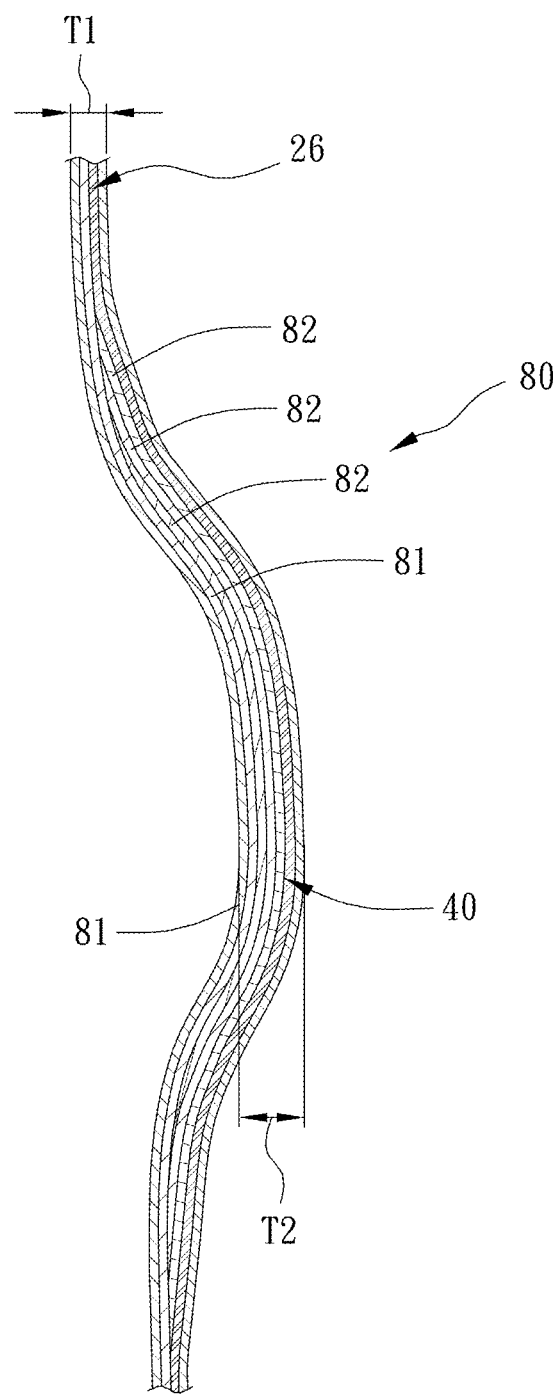
FIG. 5 is a partial cross-sectional view of a preferable embodiment of the present invention.
Figure 6:
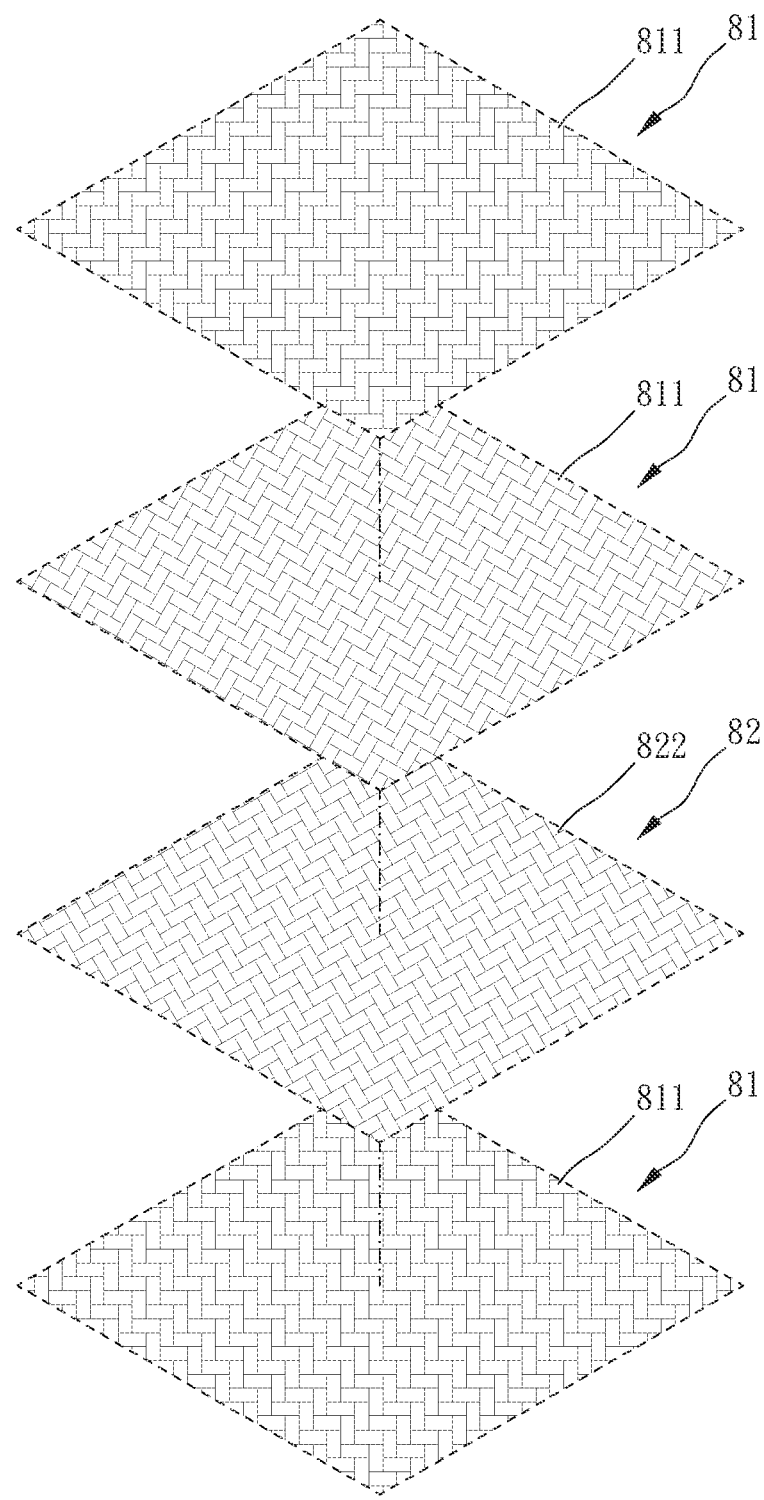
FIG. 6 is a partial breakdown drawing of a preferable embodiment of the present invention.

Furthermore, the plurality of second composite material layers 82 are disposed between the plurality of first composite material layers 81 (as shown in FIG. 5).

Each of the plurality of first composite material layers 81 is woven from a plurality of first composite fiber bundles 811 (such as carbon fiber bundles). Each of the plurality of second composite material layers 82 is woven from a plurality of second composite fiber bundles 822 (such as carbon fiber bundles). An extension direction of each of the plurality of first composite fiber bundles 811 of the at least one (each) of the plurality of first composite material layers 81 is not parallel to an extension direction of each of the plurality of first composite fiber bundles 811 of adjacent one of the plurality of first composite material layers 81 and an extension of each of the plurality of second composite fiber bundles 822 of adjacent one of the plurality of second composite material layers 82, so as to provide high structural strength.

The at least two first reinforcement ribs 40 are protruded from a rear side of the back support portion 20. A front side of the back support portion 20 is formed at least one recess 27 which corresponds to at least one of the at least two first reinforcement ribs 40. The back support portion 20 is further covered a reinforcement layer 90 within the recess 27. Besides, a plurality of said recesses 70 are formed on the front side of the back support portion 20 corresponding to each of the plurality of said second reinforcement ribs 50 and each of the two oblique reinforcement ribs 70. In this embodiment, the reinforcement layer 90 includes at least one of carbon fibers and glass fibers, so as to increase structural strength.

Figure 4:
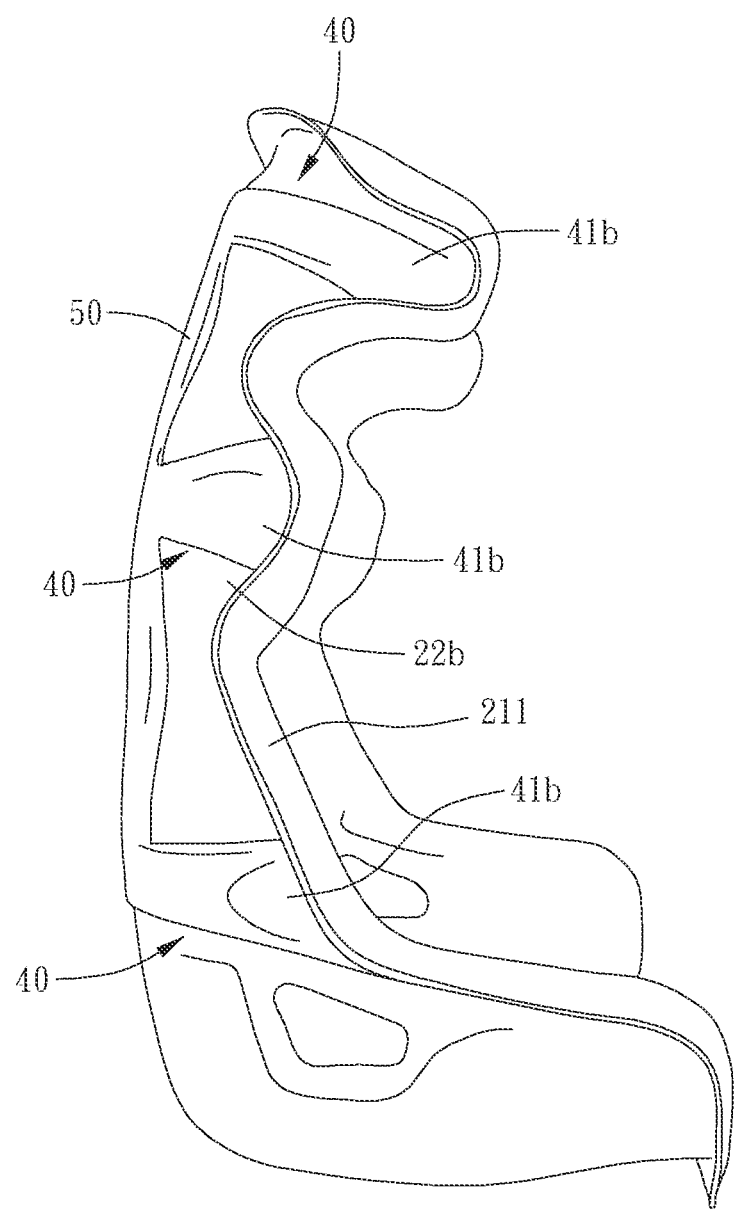
FIG. 4 is a lateral side view of a preferable embodiment of the present invention.

One end of each of the two side portions 22a, 22b has a flange 221 protruding toward a rear side of the backrest portion 21. The two side portions 22a, 22b are respectively disposed on opposite two sides of the backrest portion 21 in the lateral direction 2. As viewed in the lateral direction 2 of the back support portion 20 (as shown in FIG. 4), the flange 221 is covered at least part of the at least one first reinforcement ribs 40. Therefore, the flange 221 will be impacted by a lateral external force first to prevent the lateral external force from directly impacting at least one said first reinforcement ribs 40.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A composite material seat, including:
a main body, including a back support portion and a seat portion which are integrally formed from a composite material, the back support portion extending longitudinally, the back support portion having at least two first reinforcement ribs extending laterally and at least one second reinforcement rib extending longitudinally, and each of the at least one second reinforcement rib transversely connected with the at least two first reinforcement ribs;
wherein the back support portion is integrally deformed to protrude rearwardly to form the at least two first reinforcement ribs;
wherein a thickness dimension of each of the at least two first reinforcement ribs is greater than a thickness dimension of the back support portion.

2. The composite material seat of claim 1, wherein each of the at least two first reinforcement ribs is integrally disposed on the back support portion, the back support portion includes a lower back portion, a shoulder support portion and a head support portion which are disposed sequentially away from the seat portion, and the back support portion includes at least three said first reinforcement ribs which are respectively disposed on the lower back portion, the shoulder support portion and the head support portion.

3. The composite material seat of claim 1, wherein the back support portion includes a backrest portion and two side portions, the two side portions integrally extend from opposite two sides of the backrest portion and toward a front side of the back support portion, each of the at least two first reinforcement ribs extends along the backrest portion and the two side portions; at least one connection portion is formed where at least one of the at least two first reinforcement ribs intersects with the at least one second reinforcement rib; and the at least one second reinforcement rib and the connection portion are respectively located at an intersection portion where the backrest portion and one of the two side portions intersect with each other.

4. The composite material seat of claim 3, wherein the back support portion has a plurality of said second reinforcement ribs, and the plurality of second reinforcement ribs are disposed separately in a lateral direction; each of the at least two first reinforcement ribs is integrally disposed on the back support portion, the back support portion includes a lower back portion, a shoulder support portion and a head support portion which are disposed sequentially away from the seat portion, and the back support portion includes at least three said first reinforcement ribs which are respectively disposed on the lower back portion, the shoulder support portion and the head support portion; two end portions of each of the at least two first reinforcement ribs gradually widens from the backrest portion toward the two side portions; the back support portion has at least one oblique reinforcement rib extending obliquely, and the at least one oblique reinforcement rib is connected between the at least two first reinforcement ribs; the back support portion has two said oblique reinforcement ribs, and the two oblique reinforcement ribs are connected and crossed to each other to form an X-shaped structure; each of the two oblique reinforcement ribs is connected between the at least three of first reinforcement ribs; each of the two oblique reinforcement ribs is disposed on the lower back portion; the composite material includes a plurality of first composite material layers stacked on one another and a plurality of second composite material layers stacked on one another, the back support portion includes a base portion, each of the at least two first reinforcement ribs is protruded from the base portion, the plurality of first composite material layers are formed the base portion, the plurality of second composite material layers are disposed on at least one of the plurality of first composite material layers, the plurality of second composite material layers and the plurality of first composite material layers are formed each of the at least two first reinforcement ribs; and the plurality of first composite material layers and the plurality of second composite material layers each includes at least one of carbon fibers and glass fibers; each of the plurality of first composite material layers is woven from a plurality of first composite fiber bundles; each of the plurality of second composite material layers is woven from a plurality of second composite fiber bundles; and an extension direction of each of the plurality of first composite fiber bundles of the at least one of the plurality of first composite material layers is not parallel to an extension direction of each of the plurality of the first composite fiber bundles of adjacent one of the plurality of first composite material layers and an extension of each of the plurality of second composite fiber bundles of adjacent one of the plurality of second composite material layers; and one end of each of the two side portions has a flange protruding toward a rear side of the backrest portion, the two side portions are respectively disposed on opposite two sides of the backrest portion in the lateral direction, as viewed in the lateral direction of the back support portion, the flange is covered at least part of the at least one first reinforcement ribs.

5. The composite material seat of claim 1, wherein the back support portion includes a backrest portion and two side portions, the two side portions integrally extend from opposite two sides of the backrest portion and toward a front side of the back support portion, and at least one end portion of each of the at least two first reinforcement ribs gradually widens from the backrest portion toward at least one of the two side portions.

6. The composite material seat of claim 1, wherein the back support portion has at least one oblique reinforcement rib extending obliquely, and the at least one oblique reinforcement rib is connected between the at least two first reinforcement ribs.

7. The composite material seat of claim 6, wherein the back support portion has two said oblique reinforcement ribs, and the two oblique reinforcement ribs are connected and crossed to each other.

8. The composite material seat of claim 1, wherein the composite material includes a plurality of first composite material layers stacked on one another and a plurality of second composite material layers stacked on one another, the back support portion includes a base portion, each of the at least two first reinforcement ribs is protruded from the base portion, the plurality of first composite material layers are formed the base portion, the plurality of second composite material layers are disposed on at least one of the plurality of first composite material layers, the plurality of second composite material layers and the plurality of first composite material layers are formed each of the at least two first reinforcement ribs; and the plurality of first composite material layers and the plurality of second composite material layers each includes at least one of carbon fibers and glass fibers.

9. The composite material seat of claim 8, wherein each of the plurality of first composite material layers is woven from a plurality of first composite fiber bundles; each of the plurality of second composite material layers is woven from a plurality of second composite fiber bundles; and an extension direction of each of the plurality of first composite fiber bundles of the at least one of the plurality of first composite material layers is not parallel to an extension direction of each of the plurality of the first composite fiber bundles of adjacent one of the plurality of first composite material layers.

10. The composite material seat of claim 1, wherein the at least two first reinforcement ribs are protruded from a rear side of the back support portion, a front side of the back support portion is formed at least one recess which corresponds to at least one of the at least two first reinforcement ribs, and the back support portion is further covered a reinforcement layer within the recess.

\* \* \* \* \*